(12) United States Patent
Beeram et al.

(10) Patent No.: US 10,680,941 B2
(45) Date of Patent: Jun. 9, 2020

(54) GRACEFUL RESTART PROCEDURES FOR LABEL SWITCHED PATHS WITH LABEL STACKS

(71) Applicant: Juniper Networks, Inc., Sunnyvale, CA (US)

(72) Inventors: Vishnu Pavan Beeram, Ashburn, VA (US); Raveendra Torvi, Nashua, NH (US); Harish Sitaraman, Cupertino, CA (US); Chandrasekar Ramachandran, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 3 days.

(21) Appl. No.: 16/007,847

(22) Filed: Jun. 13, 2018

(65) Prior Publication Data

US 2019/0386914 A1    Dec. 19, 2019

(51) Int. Cl.
*H04L 12/723* (2013.01)

(52) U.S. Cl.
CPC .................... *H04L 45/50* (2013.01)

(58) Field of Classification Search
CPC ......... H04L 45/50; H04L 45/00; H04L 45/22; H04L 45/302
See application file for complete search history.

(56) References Cited

U.S. PATENT DOCUMENTS 7,177,921 B2 *   2/2007   Taguchi ................ H04L 45/302
                                                    370/389
8,971,174 B2    3/2015   Fujii et al.

OTHER PUBLICATIONS

"Junos OS: MPLS Applications Feature Guide", Juniper Networks, Inc., modified May 14, 2018, 2316 pp.
Awduche et al. "RSVP-TE: Extensions to RSVP for LSP Tunnels" Network Working Group, RFC 3209, Dec. 2001, 61 pp.
Berger, "Generalized Multi-Protocol Label Switching (GMPLS) Signaling Resource ReserVation Protocol-Traffic Engineering (RSVP-TE) Extensions" Network Working Group, RFC 3473, Jan. 2003, 42 pp.
Braden et al. "Resource ReSerVation Protocol (RSVP)—Version 1 Message Processing Rules" Network Working Group, RFC 2209, Sep. 1997, 25 pp.
Coltun et al. "OSPF for IPv6" Network Working Group, RFC 5340, Jul. 2008, 94 pp.

(Continued)

*Primary Examiner* — Chandrahas B Patel
(74) *Attorney, Agent, or Firm* — Schumaker & Sieffert, P.A.

(57) ABSTRACT

In general, techniques described are for providing graceful restart procedures for network devices of label switched paths (LSPs) implemented with label stacks. For example, a restarting network device may include a processor coupled to a memory that executes software configured to: receive a path signaling message including a recovery object that defines a reverse path of the LSP from an egress network device of the LSP to the restarting network device, including at least an upstream label and a downstream label associated with the restarting network device; determine, based on the recovery object, the upstream label and the downstream label associated with the restarting network device; and instantiate a control plane state of the restarting network device based on the recovery object.

28 Claims, 5 Drawing Sheets

(56) References Cited

OTHER PUBLICATIONS

Li et al. "IGP Requirements for Traffic Engineering with MPLS" draft-li-mpls-igp-te-00.txt, Network Working Group, Internet Draft, Feb. 1999, 6 pp.

Lindem et al. "OSPFv3 LSA Extendibility" draft-acee-ospfv3-lsa-extend.01.txt, IETF Trust, Network Working Group, Jul. 15, 2013, 27 pp.

Moy, J. "OSPF Version 2" Network Working Group, RFC 2328, Apr. 1998, 244 pp.

Oran, David, "OSI ISIS Intradomain Routing Protocol" Network Working Group, RFC 1142, Feb. 1990, 157 pp.

Satyanarayana et al. "Extensions to GMPLS Resource Reservation Protocol (RSVP) Graceful Restart" Network Working Group, RFC 5063, Oct. 2007, 24 pp.

Sheth et al. "OSPF Hybrid Broadcast and Point-to-Multipoint Interface Type" Internet Engineering Task Force (IETF), RFC 6845, Jan. 2013, 9 pp.

Sitaraman et al. "Signaling RSVP-TE tunnels on a shared MPLS forwarding plane" draft-sitaraman-mpls-rsvp-shared-labels-03.txt, Network Working Group, Internet Draft, Dec. 9, 2017, 21 pp.

U.S. Appl. No. 15/493,103, filed Apr. 20, 2017, Juniper Networks, Inc. (inventor: Sitaraman et al.) entitled Apparatus, System, and Method for Sharing Labels Across Label-Switched Paths Within Networks.

U.S. Appl. No. 15/688,813, filed Aug. 28, 2017, Juniper Networks, Inc. (inventor Sitaraman et al.) entitled Apparatis, System, and Method for Providing Node Protection Across Label-Switched Paths That Share Labels.

Extended European Search Report dated Sep. 16, 2019 received in counterpart EP Application No. 19165655.2, 10 pp.

\* cited by examiner

GRACEFUL RESTART PROCEDURES FOR LABEL SWITCHED PATHS WITH LABEL STACKS

TECHNICAL FIELD

The disclosure relates to computer networks and, more specifically, to engineering traffic flows within computer networks.

BACKGROUND

Routing devices within a network, often referred to as routers, maintain routing information that describes available routes through the network. Routers use routing protocols to exchange and accumulate topology information that describes the network. This allows a router to construct its own routing topology map of the network. Upon receiving an incoming packet, the router examines information within the packet and forwards the packet in accordance with the accumulated topology information.

Packet-based networks utilize label switching protocols for traffic engineering and other purposes. Multi-Protocol Label Switching (MPLS) is a mechanism used to engineer traffic patterns within Internet Protocol (IP) networks according to the routing information maintained by the routers in the network. By utilizing MPLS protocols, such as the Resource Reservation Protocol with Traffic Engineering extensions (RSVP-TE) or Label Distribution Protocol (LDP), label switching routers can forward traffic along a particular path through a network to a destination device, i.e., a Label Switched Path (LSP), using labels prepended to the traffic.

An LSP defines a distinct path through the network to carry MPLS packets from the source device to a destination device. Each router along a LSP allocates a label in association with the destination and propagates the label to the closest upstream router along the path. Routers along the path add (push), remove (pop), or swap the labels and perform other MPLS operations to forward the MPLS packets along the established path.

SUMMARY

In general, techniques are described for providing graceful restart procedures for network devices of label switched paths (LSPs), e.g., Resource Reservation Protocol with Traffic Engineering extensions (RSVP-TE) LSPs, implemented with label stacks. For an LSP implemented with a label stack, which may be referred to as a pop and go tunnel, the associated network devices of the LSP remove or pop labels off the top of label stacks of packets in order to propagate the packets along the LSP. In this scenario, the labels are not stored in forwarding planes of the network devices.

As an example, a network device of the LSP implemented with the label stack may use "graceful restart" procedures to re-learn its control plane state from before the restart while maintaining its forwarding plane state such that traffic may continue to be forwarded without disruption. Instead of learning a downstream label from a forwarding plane, which may not be possible for the LSP implemented with the label stack, the techniques described herein enable a restarting network device to learn a downstream label (referred to herein as "Label_Rx") via signaling from an upstream network device in the LSP. For example, the upstream router may generate a path signaling message, e.g., RSVP PATH message, that includes a recovery object, e.g., a Recovery Record Route Object (Recovery_RRO), that defines a reverse path of the LSP from an egress network device of the LSP to the restarting network device. More specifically, the recovery object includes label information for the LSP from a record route object (RRO) last received before restart by the upstream network device in a reservation signaling message, e.g., RSVP RESV message, from the restarting network device. During restart, the upstream router may send the path signaling message including the recovery object to the restarting router such that the restarting router may learn a Label_Rx from the Recovery_RRO and use the Label_Rx to re-instantiate its control plane state. In this way, graceful restart procedures are provided for network devices of LSPs implemented with label stacks, e.g., RSVP-TE pop and go tunnels.

In one example, a method includes receiving, by a network device of a label switched path (LSP) implemented with a label stack and from an upstream network device to the network device in the LSP, a path signaling message including a recovery object that defines a reverse path of the LSP from an egress network device of the LSP to the network device, wherein the recovery object includes at least an upstream label and a downstream label associated with the network device, and wherein the network device is a restarting network device. The method also includes determining, by the network device and based on the recovery object, the upstream label and the downstream label associated with the network device, wherein the upstream label associated with the network device comprises a label allocated by the network device for the upstream network device in the LSP, and wherein the downstream label associated with the network device comprises a label allocated by a downstream network device to the network device in the LSP. The method further includes instantiating, by the network device and based on the recovery object, a control plane state of the network device.

In another example, a method includes detecting, by a network device of a label switched path (LSP) implemented with a label stack, a downstream network device that is downstream to the network device in the LSP is restarting. The method also includes generating, by the network device, a path signaling message including a recovery object, wherein the recovery object includes a reverse path of the LSP from an egress network device of the LSP to the network device, and wherein the recovery object includes at least an upstream label and a downstream label associated with the downstream network device, wherein the upstream label associated with the downstream network device comprises a label allocated by the downstream network device for the network device in the LSP, and wherein the downstream label associated with the downstream network device comprises a label allocated by a network device that is downstream to the downstream network device in the LSP. The method further includes sending, by the network device and to the downstream network device, the path signaling message.

In another example, a network device of a label switched path (LSP) implemented with a label stack includes at least one processor coupled to a memory, wherein the processor executes software configured to receive a path signaling message including a recovery object, wherein the recovery object that defines a reverse path of the LSP from an egress network device of the LSP to the network device, wherein the recovery object includes at least an upstream label and a downstream label associated with the network device, and wherein the network device is a restarting network device.

The processor further executes software configured to determine, based on the recovery object, the upstream label and the downstream label associated with the network device, wherein the upstream label associated with the network device comprises a label allocated by the network device for the upstream network device in the LSP, and wherein the downstream label associated with the network device comprises a label allocated by a downstream network device to the network device in the LSP. The processor also executes software configured to instantiate a control plane state of the network device based on the recovery object.

In yet another example, a network device of a label switched path (LSP) implemented with a label stack includes at least one processor coupled to a memory, wherein the processor executes software configured to detect a downstream network device that is downstream to the network device in the LSP is restarting. The processor further executes software configured to generate a path signaling message including a recovery object, wherein the recovery object includes a reverse path of the LSP from an egress network device of the LSP to the network device, and wherein the recovery object includes at least an upstream label and a downstream label associated with the downstream network device, wherein the upstream label associated with the downstream network device comprises a label allocated by the downstream network device for the network device in the LSP, and wherein the downstream label associated with the downstream network device comprises a label allocated by a network device that is downstream to the downstream network device in the LSP. The processor also executes software configured to send the path signaling message to the downstream network device.

The details of one or more examples are set forth in the accompanying drawings and the description below. Other features, objects, and advantages of the disclosure will be apparent from the description and drawings, and from the claims.

The details of one or more examples are set forth in the accompanying drawings and the description below. Other features, objects, and advantages will be apparent from the description and drawings, and from the claims.

DETAILED DESCRIPTION

Figure 1:
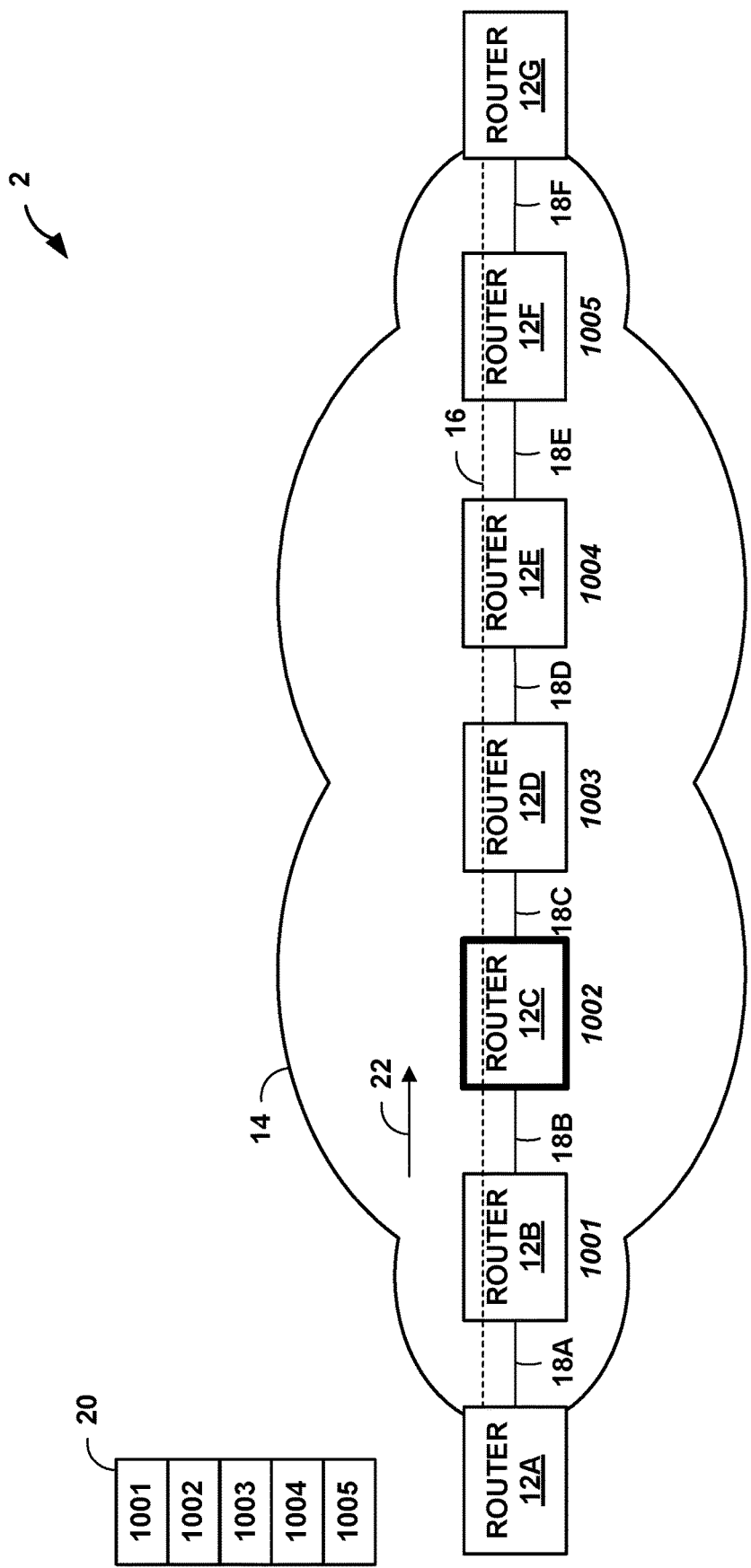
FIG. 1 is a block diagram illustrating an example computer network in which network devices perform graceful restart procedures for LSPs implemented with label stacks, in accordance with techniques described herein.

FIG. 1 is a block diagram illustrating an example computer network 2 in which network devices perform graceful restart procedures for an LSP implemented with label stacks, in accordance with techniques described herein. In the example of FIG. 1, network 14 may include network devices, such as routers 12A-12G (collectively, "routers 12"), to establish a label switched path (LSP), including a resource reservation protocol LSP. Resource reservation protocol LSPs are LSPs established by sending and signaling messages (e.g., path signaling and reservation signaling messages) that request reservation of a specified amount of bandwidth for the LSPs, for example. The configuration of computer network 2 is merely an example and may include more or less routers and/or networks.

For illustrative purposes, routers 12 may use a resource reservation protocol such as the Resource Reservation Protocol with Traffic Engineering extensions (RSVP-TE) to establish RSVP-TE LSPs, such as RSVP-TE LSP 16, that extends from ingress router 12A to egress router 12G. All network traffic sent on the LSP must follow the established path. In the example of FIG. 1, RSVP-TE LSP 16 is established across one or more links 18A-18F (collectively, "links 18") using the RSVP-TE protocol.

The sources of the network traffic received by ingress router 12A may comprise one or more devices (not shown) and/or any public or private network or the Internet that provides traffic to ingress router 12A in network 14. The destinations of the network traffic being forwarded on resource reservation protocol LSPs may comprise one or more destination devices and/or networks that may include LANs or wide area networks (WANs) that comprise a plurality of devices. For example, destination devices may include personal computers, laptops, workstations, personal digital assistants (PDAs), wireless devices, network-ready appliances, file servers, print servers, or other devices that access the source via network 14.

As further described below, routers 12 may establish LSPs implemented with label stacks, for example, by using the RSVP-TE protocol with pop and go tunneling techniques. For example, routers 12 may use RSVP-TE to compute paths that satisfy certain constraints on RSVP-TE LSP 16 imposed by a network administrator. For example, ingress router 12A may use RSVP-TE to establish multiprotocol label switching (MPLS) transport LSPs based on constraint information about links 18 within network 14 including, for example, reserved bandwidth availability, link color, Shared Rink Link Group (SRLG), and the like. RSVP-TE may use reserved bandwidth availability information accumulated by route advertisements from a link-state interior gateway protocol (IGP), such as the Intermediate System—Intermediate System (ISIS) protocol or the Open Shortest Path First (OSPF) protocol to configure RSVP-TE LSP 16. After computing the path, ingress router 12A may send a path signaling message, e.g., RSVP PATH message, destined toward egress router 12G that requests establishment of RSVP-TE LSP 16 along the computed path.

Typically, when implementing LSPs, a path signaling message, e.g., RSVP PATH message, includes a label request object that requests each router along the path to provide a respective downstream-assigned reserved label in a reservation signaling message, e.g., RSVP RESV message, in response to that path signaling message. Each of routers along the path that receives the path signaling message including the label request object is triggered to allocate a respective label object for a corresponding reservation signaling message in response to that path signaling message. The label object indicates to the neighboring upstream router that the router sending the reservation signaling message is a downstream next hop router.

For example, when an egress router of the RSVP-TE LSP receives the RSVP PATH message, the egress router responds to the label request object in the RSVP PATH message by including a label object in an RSVP RESV message that indicates to a transit router that the egress router is the next hop router. The egress router sends the RSVP RESV message back upstream towards the ingress router following the path state created by the RSVP PATH message in reverse order.

Each of the routers along the path typically receives the RSVP RESV message having a respective label object from a corresponding downstream router, and uses the received label from the downstream router (referred to herein as "Label_Rx" or "downstream label") to identify outgoing traffic associated with the sender of the RSVP RESV message. Each of transit routers along the path typically allocates a new label (referred to herein as "Label_Tx" or "upstream label"), swaps Label_Rx with Label_Tx as the label object of the RSVP RESV message, and sends the RSVP RESV message with Label_Tx to the upstream router. The Label_Tx that is sent to an upstream router is a label that an upstream transit router may use to direct incoming traffic to its downstream router. That is, each of the transit routers may typically receive a respective Label_Rx from a downstream router, swap the Label_Rx for a respective Label_Tx, and send the respective Label_Tx to an upstream router.

A given transit router that performs the label swapping (as described above) programs its forwarding plane based on the received downstream label (e.g., Label_Rx) and the allocated upstream label (e.g., Label_Tx) in order to map incoming labeled packets to a next hop label forwarding entry. When the RSVP RESV message reaches the ingress router, the RSVP-TE LSP is effectively established. Further examples of RSVP-TE are described in D. Awduche et al., "RSVP-TE: Extensions to RSVP for LSP Tunnels" Request for Comments 3209, December 2001, the entire contents being incorporated by reference herein.

Routers 12 may further implement LSPs using label stacks, such as pop and go tunneling for RSVP-TE, to reduce forwarding plane state and improve system performance. For example, instead of swapping labels (as described above) to signal an RSVP-TE LSP, each of routers 12 may instead allocate a respective pop label that causes a transit router to pop a corresponding label off the top of a label stack and forward the packet to a neighboring downstream router toward the egress router. For routers establishing RSVP-TE LSPs implemented with pop and go tunnels, the pop labels are not stored in forwarding planes of the network devices. Further examples of RSVP-TE pop and go labels are described in Sitaraman, H., et al., "Signaling RSVP-TE tunnels on a shared MPLS forwarding plane," draft-ietf-mpls-rsvp-shared-labels-00.txt, Dec. 19, 2017, the entire contents of which are incorporated by reference herein.

In the example of FIG. 1, each of transit routers 12B-12F may allocate a respective pop label, e.g., pop labels 1001-1005, and advertise the respective pop label in a label object of an RSVP RESV message. Each or routers 12B-12F may also record the respective pop label in a Record Route Object (RRO) of the RSVP RESV message as the RSVP RESV message traverses network 14 toward ingress router 12A. The RRO may be used to collect detailed path information (otherwise referred to herein as "sub-objects") and is useful for loop detection and for diagnostics. For example, the RRO may include a list of labels corresponding to a given path. In the example of FIG. 1, router 12A may receive an RSVP RESV message including an RRO with labels of a path from router 12A to router 12G. Similarly, router 12B may receive an RSVP RESV message including an RRO with labels of a path from router 12B to router 12G, and so on.

Ingress router 12A may receive the RSVP RESV message and may construct label stack 20 from the pop labels recorded in the RRO. When forwarding traffic destined for egress router 12G, ingress router 12A may inject a packet with label stack 20 into network 14 to direct the packet along RSVP-TE LSP 16. For example, when router 12B receives the packet with label 1001 on the top of label stack 20, router 12B may pop label 1001 off the top of label stack 20 and forward the packet downstream towards egress router 12G. Router 12C may then receive the packet with label 1002 on the top of label stack 20. Router 12C may pop label 1002 off the top of label stack 20 and forward the packet downstream towards egress router 12G. This process of popping and forwarding continues at each of the remaining transit routers until the packet reaches egress router 12G. Although FIG. 1 is illustrated as allocating a single label, each of transit routers 12B-12F may allocate any number of labels corresponding to the number neighboring routers of the transit router.

In the event of a routing communication session failure, i.e., the session faults or "goes down," routers 12 may support "graceful restart" procedures. A restarting router of routers 12 may use graceful restart procedures to re-learn the control plane state prior to the restart while maintaining the forwarding plane state such that traffic may continue to be forwarded without disruption. Further examples of graceful restart are described in Berger, L., "Generalized Multi-Protocol Label Switching (GMPLS) Signaling Resource ReserVation Protocol-Traffic Engineering (RSVP-TE) Extensions" Request for Comments 3473, January 2003, and Satyanarayana, A., "Extensions to GMPLS Resource Reservation Protocol (RSVP) Graceful Restart," Request for Comments 5063, October 2007, the entire contents of both of which are incorporated by reference herein. However, graceful restart procedures as described in RFC 3473 and RFC 5063 are unable to re-instantiate the control plane state for routers of an LSP implemented with label stacks, as further described below.

For graceful restart procedures described in Request for Comments (RFC) 3473, a restarting router relies on one or more neighboring routers to replicate complete path state and relevant reservation state information. For example, a neighboring upstream router to the restarting router typically sends an RSVP PATH message including a Recovery_Label object specifying only an upstream label that the restarting router advertised to the upstream router before restart (e.g., Label_Tx).

The restarting router may receive the Recovery_Label object containing a label value corresponding to Label_Tx and learns a Label_Rx from its forwarding plane. For example, the restarting router may search its forwarding table (that was preserved through restart) for an entry whose incoming label (e.g., Label_Tx) is equal to the label carried in the Recovery_Label object. The restarting router may then place an outgoing label (e.g., Label_Rx) recovered from the forwarding entry in a Suggested_Label of an RSVP PATH message, and send the RSVP PATH message including the Suggested_Label to its downstream router. When the restarting router receives a RSVP RESV message, the restarting router may determine whether the label value in the RSVP RESV message differs from the Suggested_Label that was sent downstream. If the values match, then the restarting router may re-instantiate its control plane state by using the label specified in the RSVP RESV message. If the label value in the RSVP RESV message differs from the Suggested_Label, then the restarting router generates an error message (e.g., ResvErr message). However, in examples where routers implement RSVP-TE pop and go tunneling, the restarting router that implements graceful restart procedures as described in RFC 3473 is unable to determine Label_Rx from the forwarding plane because labels are no longer stored in the forwarding plane, and is therefore unable to re-instantiate its control plane state.

Alternatively, or additionally, for graceful restart procedures described in RFC 5063, a restarting router may additionally receive from a downstream router a "RecoveryPath" message including another Recovery_Label object specifying a downstream label (e.g., Label_Rx) from a downstream router. In this example, the restarting router may use the Recovery_Label object in the RecoveryPath message together with the Recovery_Label object in the RSVP PATH message received from the upstream router to associate control and forwarding plane state and to validate the forwarding plane state with the state presented by the neighboring routers. However, the restarting router that implements graceful restart procedures as described in RFC 5063 is unable to learn of the upstream and downstream labels from the same signaling message.

In accordance with the techniques described herein, graceful restart procedures are described for LSPs implemented with label stacks in which a restarting network device may learn of an upstream (e.g., Label_Tx) and downstream label (e.g., Label_Rx) via signaling instead of a forwarding plane. In the example of FIG. 1, routers 12 may advertise their capability (e.g., bit assignment) of supporting a recovery object, such as a Recovery Record Route Object (referred to herein as "Recovery_RRO"), that defines a reverse path of RSVP-TE LSP 16 from egress router 12G to the restarting router, e.g., router 12C. For example, a restarting router, e.g., router 12C, may advertise to an upstream router, e.g., router 12B, a Hello message including a capability object that indicates router 12C is capable of supporting Recovery_RRO.

Upstream router 12B may generate a Recovery_RRO that includes label information for RSVP-TE LSP 16 from an RRO last received before restart by router 12B in a reservation signaling message (e.g., RSVP RESV message) from restarting router 12C. In this example, the RRO received by router 12B includes labels that define a reverse path from egress router 12G of RSVP-TE LSP 16 to restarting router 12C. In particular, the labels may include an upstream label (e.g., Label_Tx) and downstream label (e.g., Label_Rx) associated with each of routers 12C-12G. Upstream router 12B may include the labels from the RRO in the Recovery_RRO.

Upstream router 12B may include the Recovery_RRO in an RSVP PATH message, e.g., RSVP PATH message 22, and send the Recovery_RRO to restarting router 12C. That is, rather than sending an RSVP PATH message with a Recovery_Label object that only indicates the upstream label (e.g., Label_Tx) that restarting router 12C advertised before restart, upstream router 12B may send to restarting router 12C an RSVP PATH message 22 including the Recovery_RRO that includes labels that define a reverse path from egress router 12G of RSVP-TE LSP 16 to restarting router 12C.

Restarting router 12C may receive RSVP PATH message 22 including the Recovery_RRO and may determine from the Recovery_RRO, the upstream label (e.g., Label_Tx) and the downstream label (e.g., Label_Rx) associated with restarting router 12C. For example, restarting router 12C may learn and validate the Label_Tx with the Label_Tx received prior to restart. Restarting router 12C may also learn Label_Rx and place the Label_Rx in a Suggested_Label of an RSVP PATH message that is sent to its downstream router, e.g., router 12D, which processes the RSVP PATH message normally. When restarting router 12C receives a RSVP RESV message in response to that RSVP PATH message, restarting router 12C may determine whether the label value in RSVP RESV message differs from the Suggested_Label that was sent downstream. If the values match, then restarting router 12C may re-instantiate its respective control plane state by using the label specified in the corresponding RSVP RESV message. If the label value in the RSVP RESV message differs from the Suggested_Label, then restarting router 12C generates an error message (e.g., ResvErr message). In this way, restarting router 12C that establishes an LSP implemented with label stacks (e.g., RSVP-TE with pop and go tunneling) may determine an upstream and downstream label via signaling instead of a forwarding plane.

Figure 2:
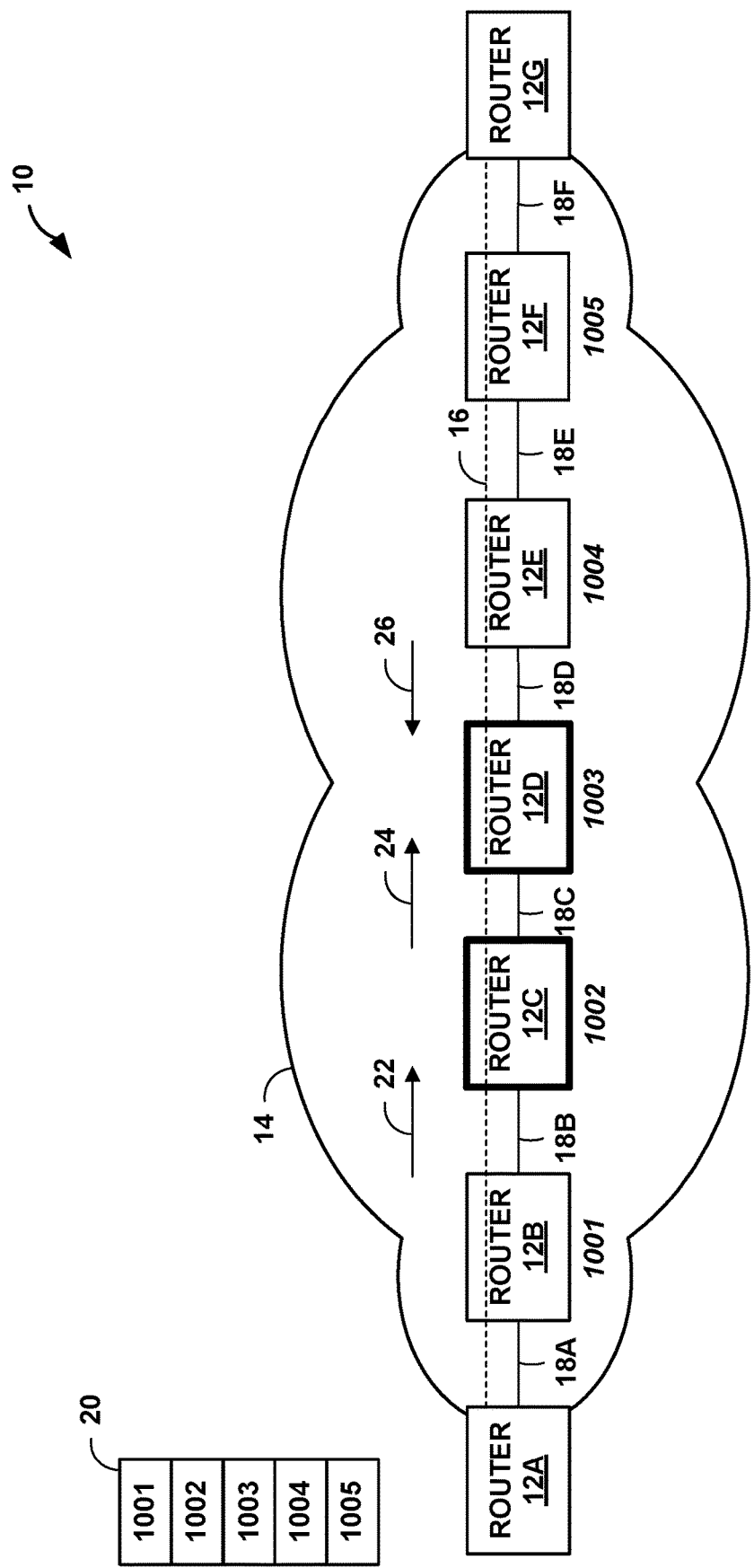
FIG. 2 is a block diagram illustrating another example in which network devices perform graceful restart for LSPs implemented with label stacks, in accordance with techniques described herein.

FIG. 2 is a block diagram illustrating another example in which network devices perform graceful restart for LSPs implemented with label stacks, e.g., RSVP-TE pop and go tunnels, in accordance with techniques described herein. Network 14 of FIG. 2 is similar to network 14 of FIG. 1, except as described below.

As described above, a restarting router using graceful restart procedures described in RFC 5063 may use a Recovery_Label object in the RecoveryPath message together with the Recovery_Label object in the RSVP PATH message received from the upstream router to associate control and forwarding plane state and to validate the forwarding plane state with the state presented by the neighboring routers. However, in examples where there are multiple restarting routers, the upstream restarting router (e.g., router 12C) is unable to receive a RecoveryPath message from its downstream router because the downstream router (e.g., router 12D) is also restarting.

In the example of FIG. 2, a plurality of routers 12, e.g., router 12C and router 12D, may restart. In this example, neighboring upstream router 12B may detect router 12C is a restarting router. Upstream router 12B may generate a path signaling message, e.g., RSVP PATH message 22, that includes a recovery object, e.g., Recovery_RRO, having label information for RSVP-TE LSP 16 from an RRO last received before restart by router 12B in a reservation signaling message (e.g., RSVP RESV message) from restarting router 12C. As described above, the Recovery_RRO may include labels that define a reverse path from egress router 12G of RSVP-TE LSP 16 to restarting router 12C, such as an upstream label (e.g., Label_Tx) and downstream label (e.g., Label_Rx) associated with each of routers 12C-12G. Rather than sending an RSVP PATH message with a Recovery_Label object that specifies only the upstream label (e.g., Label_Tx), upstream router 12B may send RSVP PATH message 22 including the Recovery_RRO that includes at least an upstream label (e.g., Label_Tx) and downstream label (Label_Rx) associated with restarting router 12C.

Restarting router 12C may receive RSVP PATH message 22 and may determine from the Recovery_RRO, the Label_Tx and Label_Rx associated with restarting router 12C. For example, restarting router 12C may learn and validate the Label_Tx with the Label_Tx received prior to restart. Restarting router 12C may also learn Label_Rx from the Recovery_RRO and may re-instantiate its control plane state based on the Label_Rx. For example, when restarting router 12C receives an RSVP RESV message in response to RSVP PATH message 22, restarting router 12C may determine whether the label value in the RSVP RESV message differs from the Label_Rx that was learned. If the values match, then restarting router 12C may re-instantiate its respective control plane state using the label specified in the corresponding RSVP RESV message.

Restarting router 12D may also be restarting. In this example, router 12D may also advertise before restart of its capability of supporting a recovery object, e.g., Recovery_RRO. For example, a restarting router, e.g., router 12D, may advertise to an upstream router, e.g., router 12C, a Hello message including a capability object that indicates router 12D is capable of supporting Recovery_RRO.

Restarting router 12C ("upstream restarting router 12C") may detect router 12D is restarting ("downstream restarting router 12D"). Restarting router 12C may prune the Recovery_RRO to remove the local sub-objects, e.g., labels associated with restarting router 12C, to construct a modified Recovery_RRO. That is, the modified Recovery_RRO includes a reverse path from egress router 12G to restarting router 12D. Restarting router 12C may send RSVP PATH message 24 including the modified Recovery_RRO to restarting router 12D.

Restarting router 12D receives the RSVP PATH message 24 and may determine from the modified Recovery_RRO, the Label_Tx and Label_Rx associated with restarting router 12D. For example, restarting router 12D may learn and validate the Label_Tx with the Label_Tx received prior to restart. Restarting router 12D may also learn Label_Rx from the Recovery_RRO and place the Label_Rx in a Suggested_Label of an RSVP PATH message that is sent to its downstream router, e.g., router 12E, which processes the RSVP PATH message normally. When restarting router 12D receives an RSVP RESV message in response to that RSVP PATH message, restarting router 12D may determine whether the label value in the RSVP RESV message differs from the Suggested_Label that was sent downstream. If the values match, then restarting router 12D may re-instantiate its respective control plane state using the label specified in the corresponding RSVP RESV message. If the label value in the RSVP RESV message differs from the Suggested_Label, then restarting router 12D generates an error message (e.g., ResvErr message).

Alternatively, restarting router 12D may validate Label_Rx with a RecoveryPath message 26 received from downstream router 12E that includes a Recovery_Label object specifying a downstream label received from downstream router 12E. Restarting router 12D may use the information in RecoveryPath message 26 received from downstream router 12E together with the Recovery_RRO in the RSVP PATH message received from upstream router 12C to associate control and forwarding plane state and to validate its forwarding plane state with the state presented by routers 12C and 12E.

Figure 3:
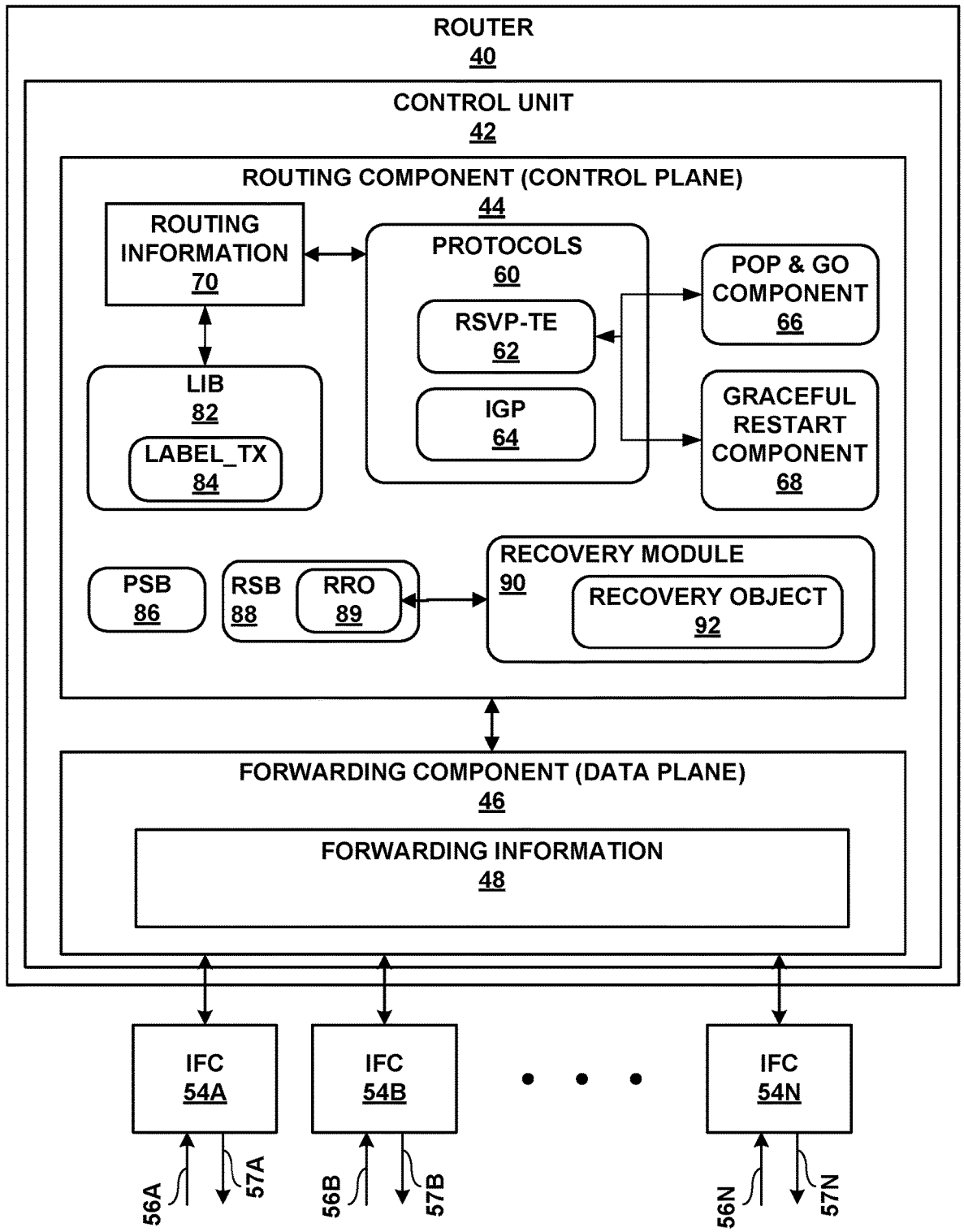
FIG. 3 is a block diagram illustrating a router performing various aspects of the techniques described in this disclosure.

FIG. 3 is a block diagram illustrating an example router 40 that performs various aspects of the techniques described in this disclosure. Router 40 may represent any of routers 12 of FIGS. 1-2. While described with respect to router 40, the techniques may be implemented by any other type of network device capable of implementing at least routing protocols including a resource reservation protocol, such as RSVP-TE, with pop and go tunneling. Thus, while described with respect to router 40, the techniques should not be limited to router 40 described with respect to the example of FIG. 3.

In the example of FIG. 3, router 40 includes interface cards 54A-54N ("IFCs 54") that receive and send data units, such as packet flows, via network links 56A-56N and 57A-57N, respectively. Router 40 may include a chassis (not shown) having a number of slots for receiving a set of cards, including IFCs 54. Each card may be inserted into a corresponding slot of the chassis for electrically coupling the card to routing component 44 via high-speed switch (not shown), which may comprise, for example, switch fabric, switchgear, a configurable network switch or hub, or other high-speed switching mechanisms. IFCs 54 may be coupled to network links 56A-56N and 57A-57N via a number of physical interface ports (not shown). Generally, IFCs 54 may each represent one or more network interfaces by which router 40 may interface with links of a network, such as links 18 as shown in the example of FIG. 1.

In general, router 40 may include a control unit 42 that determines routes of received packets and forwards the packets accordingly via IFCs 54. In the example of FIG. 3, control unit 42 includes routing component 44 (control plane) that configures and controls packet forwarding operations applied by packet forwarding component 46 (data plane).

Routing component 44 provides an operating environment for various routing protocols 60 that execute at different layers of a network stack. Routing component 44 is responsible for the maintenance of routing information 70 to reflect the current topology of a network and other network entities to which router 40 is connected. In particular, routing protocols periodically update routing information 70 to accurately reflect the topology of the network and other entities based on routing protocol messages received by router 40. The protocols may be software processes executing on one or more processors. For example, routing component 44 includes network protocols that operate at a network layer of the network stack, which are typically implemented as executable software instructions.

In the example of FIG. 3, protocols 60 may include RSVP-TE 62 to implement Resource Reservation Protocol with Traffic Extensions (RSVP-TE) protocol to establish RSVP-TE LSPs (e.g., RSVP-TE LSPs 16 of FIG. 1). For example, RSVP-TE 62 may implement RSVP-TE protocol to generate and send RSVP PATH and RSVP RESV messages for establishing LSPs.

Protocols 60 may also include an IGP 64 to implement an IGP protocol to exchange link state information, and facilitate forwarding of packets or other data units between endpoint devices. In some examples, IGP 64 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and Internet Draft for the Network Working Group, by A. Lindem et al., entitled "OSPFv3 LSA Extendibility," dated July 2013, draft-acee-ospfv3-lsa-extend-01.txt, each of which are incorporated by reference as if set forth in their respective entireties. In some examples, IGP 64 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990, which is incorporated by reference in its entirety. IGP 64 may include traffic extensions that support traffic engineering with Multi-protocol Label Switching (MPLS), as described in Internet Draft for Network Working Group, by Tony Li et al., entitled "IGP Requirements for Traffic Engineering with MPLS,"

dated February 1999, draft-li-mpls-igp-te-00.txt, which is incorporated by reference in its entirety.

In some examples, routing component 44 includes a pop and go component 66 to implement pop and go tunneling techniques for resource reservation protocols (e.g., RSVP-TE) for specifying how router 40 may signal labels. For example, pop and go component 66 may instruct router 40 to allocate a respective pop label that causes router 40 to pop a corresponding label off the top of a label stack of a received packet and forward the packet to a downstream neighbor toward an egress router. Although router 40 of FIG. 3 is illustrated with a pop and go component 66 for allocating a respective pop label for label stacks, router 40 may include any component that may implement label stacks for any type of LSPs as described herein.

In some examples, routing component 44 includes a graceful restart component 68 to implement graceful restart techniques for resources reservation protocols (e.g., RSVP-TE) to support a Recovery_Label object in an RSVP PATH message (as described in Request for Comments 3473 described above), and support a Recovery_Label object in a RecoveryPath message (as described in Request for Comments 5063 described above). In the example of FIG. 3, graceful restart component 68 may further support a recovery object, e.g., recovery object 92. For example, router 40 may use graceful restart component 68 to advertise a capability object to indicate to other routers on the LSP that router 40 supports the Recovery_RRO.

By executing the routing protocols, routing component 44 identifies existing routes through the network and determines new routes through the network. Routing component 44 stores routing information 70 that includes, for example, known routes through the network. Forwarding component 46 stores forwarding information 48 that includes destinations of output links 57. Forwarding information 48 may be generated in accordance with routing information 70. Routing component 44 may use RSVP-TE 62 to exchange label mapping messages with other routers along the LSPs and update a label information base (LIB) 82.

Routing component 44 may include a Label Information Base (LIB) 82 for maintaining mappings of next hop labels to the next hops for each route within the network. Routing component 44 selects specific paths through the network and uses label mappings in LIB 82 to construct a label stack to propagate packets along the LSP. In some examples in which routing component 44 uses pop and go component 66, LIB 82 may include upstream labels ("Label_Tx 84") that indicates the upstream label to an upstream router. LIB 82 may be in the form of a variety of data structures, such as a number of tables, link lists, radix trees, databases, flat files, or other data structures.

Path State Block (PSB) 86 stores state data from RSVP PATH messages for each established LSP session. PSB 86 maintains copies of each RSVP PATH message, including a label request object for the requested LSP session. Reservation State Block (RSB) 88 stores reservation requests for RSVP RESV messages for each established LSP session. RSB 88 maintains copies of each RSVP RESV message, including a label request object for each established LSP session. RSB 88 may also include a Record Route Object (RRO) 89 that defines a reverse path from an egress router to a restarting router. Additional details regarding the implementation and function of PSB 86 and RSB 88 are provided by R. Braden et al., "Resource ReSerVation Protocol (RSVP)—Version 1 Message Processing Rules," Network Working Group RFC2209, September 1997, the entire contents of which are incorporated by reference herein.

Routing component 44 may use RSVP-TE 62 to record the label request objects of RSVP PATH messages and RSVP RESV messages in RRO 89. RRO 89 is used to collect detailed path information (otherwise referred to herein as "sub-objects"), such as a list of labels corresponding to a given path.

In accordance with some example aspects of the techniques of this disclosure, routing component 44 may use graceful restart component 68 to advertise a capability object to indicate to other routers on the LSP that router 40 supports a recovery object, e.g., recovery object 92. Routing component 44 may include a recovery module 90 to generate a recovery object 92 (e.g., Recovery_RRO). Recovery module 90 may include information contained in RRO 89 into recovery object 92, such as path labels (e.g., Label_Tx and Label_Rx). Recovery module 90 may include recovery object 92 in messages generated by RSVP-TE 62, e.g., RSVP PATH message, to provide a restarting router an upstream label and downstream label. In some examples where there are multiple restarting routers, recovery module 90 of a router 40 acting as an upstream restarting router (e.g., router 12C of FIG. 2) may remove local sub-objects (e.g., labels associated with restarting router 12C) from Recovery_RRO 92 before sending an RSVP PATH message including a modified Recovery_RRO to a downstream restarting router (e.g., router 12D of FIG. 2).

Although described for purposes of example with respect to a router, router 40 may be more generally a network device having routing functionality, and need not necessarily be a dedicated routing device. The architecture of router 40 illustrated in FIG. 3 is shown for example purposes only. The techniques of this disclosure are not limited to this architecture. In other examples, router 40 may be configured in a variety of ways. In one example, some of the functionally of control unit 42 may be distributed within IFCs 54. In another example, control unit 42 may comprise a plurality of packet forwarding engines operated as slave routers.

Control unit 42 may be implemented solely in software, or hardware, or may be implemented as a combination of software, hardware, or firmware. For example, control unit 42 may include one or more processors that execute program code in the form of software instructions. In that case, the various software components/modules of control unit 42 may comprise executable instructions stored on a computer-readable storage medium, such as computer memory or hard disk.

Figure 4:
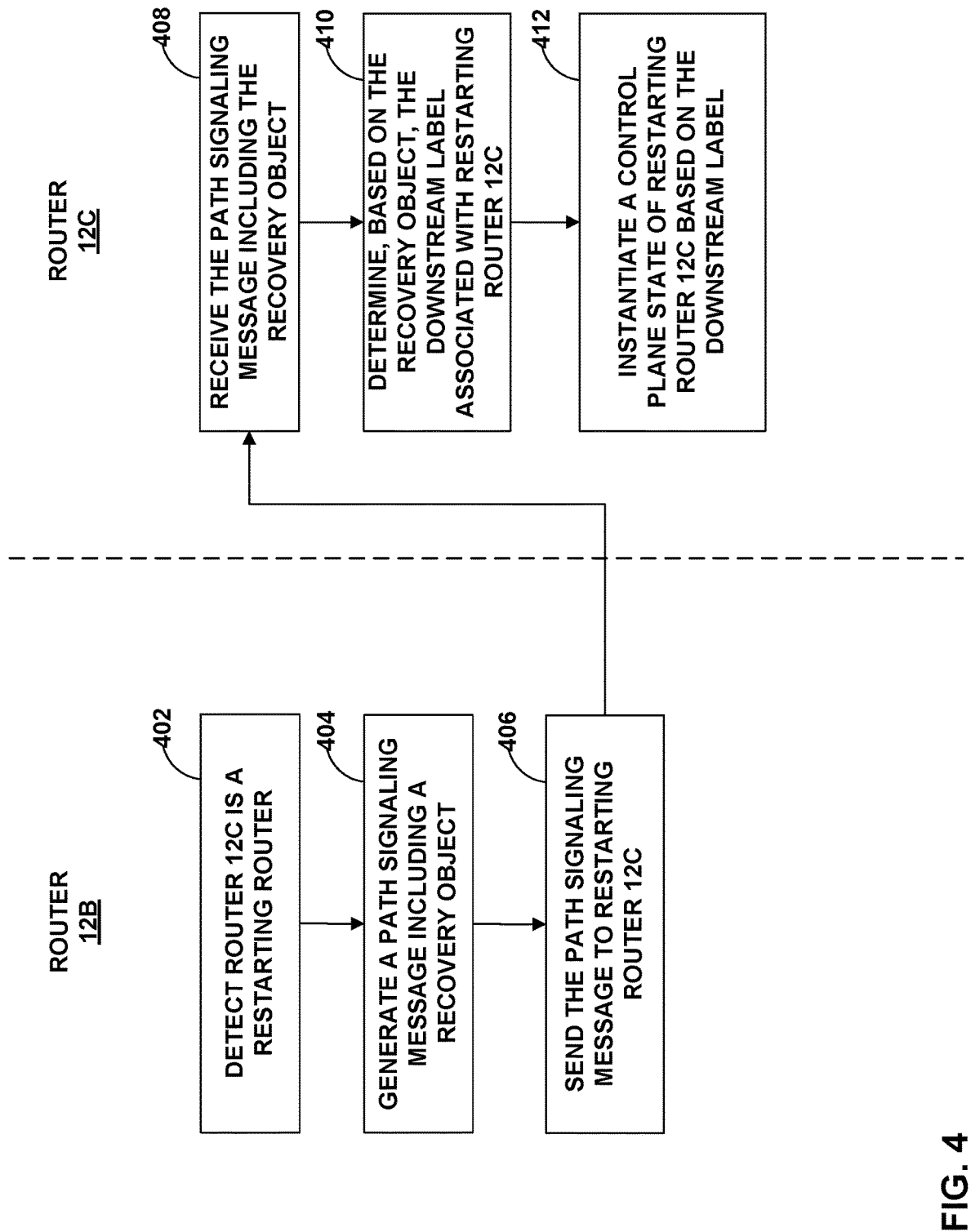
FIG. 4 is a flowchart illustrating an example operation of graceful restart procedures for LSPs implemented with label stacks, in accordance with the techniques described herein.

FIG. 4 is a flowchart illustrating an example operation of graceful restart procedures for a resource reservation protocol LSP implemented with pop and go tunnels. FIG. 4 is described for purposes of example with respect to computer network 2 of FIG. 1. In this example, assume router 12C is a restarting router.

Before restart, restarting router 12C may advertise before restart a message (e.g., "Hello" message) including a capability object that indicates router 12C is capable of using a recovery object, e.g., Recovery_RRO. Router 12B may receive the Hello message and determine that router 12C is capable of using Recovery_RRO.

Router 12B may detect router 12C is a restarting router (402). For example, router 12B may detect a routing communication session failure for router 12C, i.e., the session faults or "goes down."

Router 12B may generate a path signaling message, e.g., RSVP PATH message, including a recovery object, e.g., Recovery_RRO (404). For example, prior to restart, router 12B may receive from downstream router 12C an RSVP RESV message including an RRO that defines a reverse path of the LSP from an egress router of the LSP to the restarting router, e.g., router 12C. In particular, the RRO may include a Label_Tx and Label_Rx associated with router 12C, and labels for each of the downstream routers to the egress router. During restart, router 12B may include the label information from the RRO in an RSVP PATH message to be sent to restarting router 12C. In some examples, router 12B may include the Recovery_RRO in a Recovery_Label field of the RSVP PATH message.

Router 12B may send the path signaling message including the Recovery_RRO to restarting router 12C (406). Restarting router 12C may receive the RSVP PATH message including the Recovery_RRO (408), and based on the Recovery_RRO, restarting router 12C may determine the downstream label (e.g., Label_Rx) associated with router 12C (410).

Restarting router 12C may instantiate its control plane state based on the downstream label (412). For example, in response to learning the Label_Rx, restarting router 12C may place the Label_Rx in a Suggested_Label of an RSVP PATH message, and send the RSVP PATH message to its downstream router, e.g., router 12D, which processes the RSVP PATH message normally. When restarting router 12C receives a RSVP RESV message in response to that RSVP PATH message, restarting router 12C may determine whether the label value in RSVP RESV message differs from the Suggested_Label that was sent downstream. If the values match, then restarting router 12C may re-instantiate its control plane state by using the label specified in the corresponding RSVP RESV message.

Figure 5:
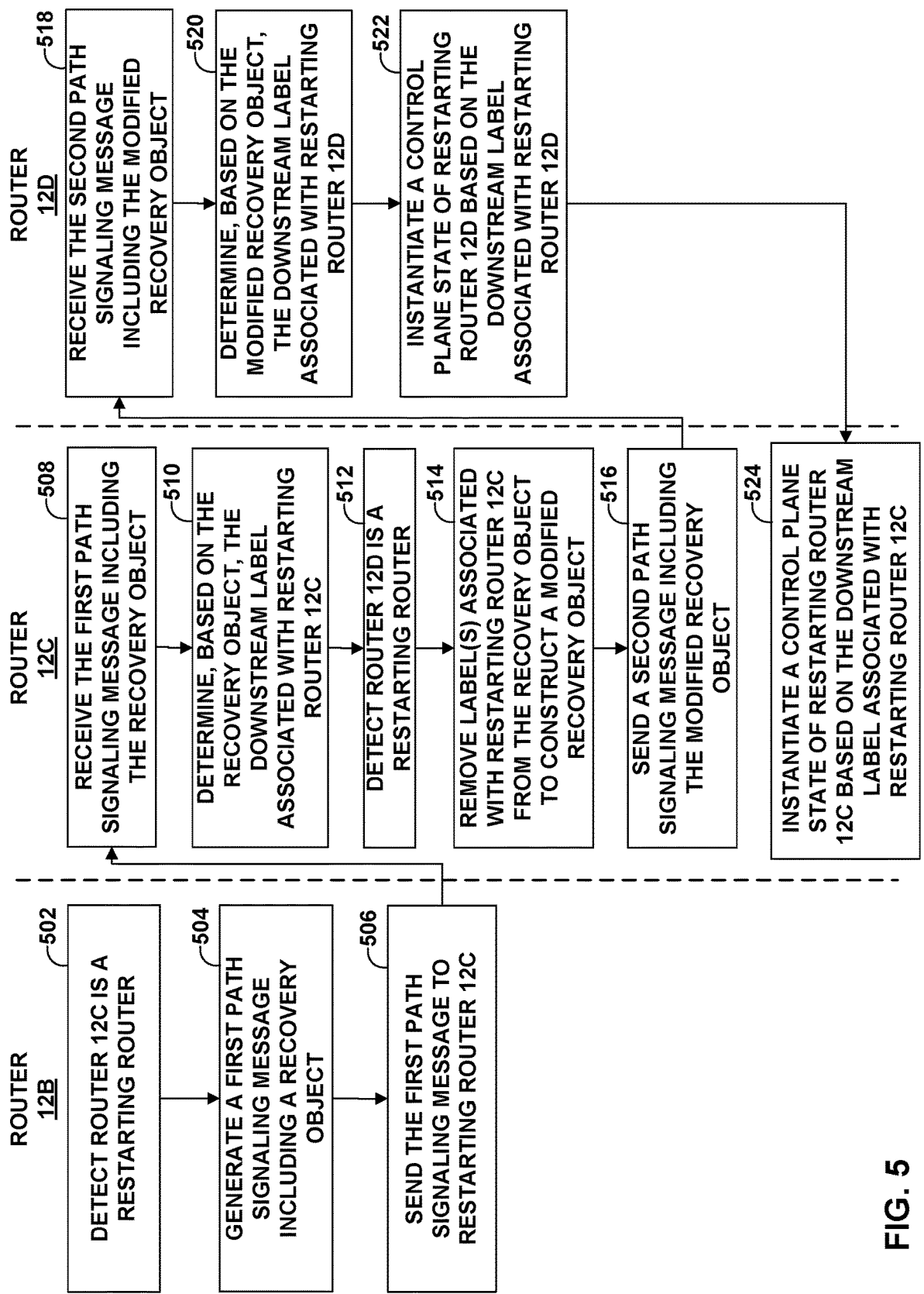
FIG. 5 is a flowchart illustrating another example operation of graceful restart procedures for LSPs implemented with label stacks, in accordance with the techniques described herein.

FIG. 5 is a flowchart illustrating another example operation of graceful restart procedures for a resource reservation protocol LSP implemented with pop and go tunnels. FIG. 5 is described for purposes of example with respect to computer network 2 of FIG. 2. In this example, assume routers 12C and 12D are restarting routers.

Before restart, router 12C may advertise a message (e.g., "Hello" message) including a capability object that indicates router 12C is capable of using a recovery object, e.g., Recovery_RRO. Router 12B may receive the Hello message and determine that router 12C is capable of using Recovery_RRO. Similarly, router 12D may advertise a message (e.g., "Hello" message) including a capability object that indicates router 12D is capable of using a recovery object, e.g., Recovery_RRO. Router 12C may receive the Hello message and determine that router 12D is capable of using Recovery_RRO.

Router 12B may detect router 12C is a restarting router (502). For example, router 12B may detect a routing communication session failure for router 12C, i.e., the session faults or "goes down."

Router 12B may generate a first path signaling message, e.g., RSVP PATH message, including a recovery object, e.g., Recovery_RRO (504). For example, prior to restart, router 12B may receive from router 12C an RSVP RESV message including an RRO that defines a reverse path of the LSP from an egress router of the LSP to the restarting router, e.g., router 12C. In particular, the RRO may include a Label_Tx and Label_Rx associated with router 12C, and labels for each of the downstream routers to the egress router. During restart, router 12B may include label information from an RRO in an RSVP PATH message to be sent to restarting router 12C. In some examples, router 12B may include the Recovery_RRO in a Recovery_Label field of the RSVP PATH message.

Router 12B may send the first path signaling message including the Recovery_RRO to restarting router 12C (506). Restarting router 12C may receive the RSVP PATH message including the Recovery_RRO (508), and based on the Recovery_RRO, router 12C may determine the downstream label (e.g., Label_Rx) associated with router 12C (510).

Router 12C may detect router 12D is a restarting router (512). For example, router 12C may detect a routing communication session failure for router 12D, i.e., the session faults or "goes down."

Upstream restarting router 12C may remove one or more labels associated with restarting router 12C from the recovery object to construct a modified recovery object (514). For example, upstream restarting router 12C may prune the Recovery_RRO to remove the local sub-objects, e.g., objects associated with router 12C. That is, the modified Recovery_RRO includes a reverse path from egress router 12G to router 12D.

Upstream restarting router 12C may send a second path signaling message, e.g., RSVP PATH message, with the modified Recovery_RRO to downstream restarting router 12D (516). Downstream restarting router 12D receives the RSVP PATH message including the modified Recovery_RRO (524). Downstream restarting router 12D may determine, based on the modified Recovery_RRO, the downstream label (e.g., Label_Rx) associated with restarting router 12D (518).

Downstream restarting router 12D may instantiate its control plane state based on the downstream label associated with restarting router 12D (520). For example, downstream restarting router 12D may learn Label_Rx from Recovery_RRO included in the RSVP PATH message and place the Label_Rx in a Suggested_Label of an RSVP PATH message that is sent to its downstream router (not shown), which processes the RSVP PATH message normally. When downstream restarting router 12D receives a RSVP RESV message in response to that RSVP PATH message, restarting router 12D may determine whether the label value in RSVP RESV message differs from the Suggested_Label that was sent downstream. If the values match, then downstream restarting router 12D may re-instantiate its control plane state by using the label specified in the corresponding RSVP RESV message. In some examples, downstream restarting router 12D may validate Label_Rx with a RecoveryPath message received from its downstream router (not shown). In this example, the RecoveryPath message may include a Recovery_Label object specifying a downstream label received from the downstream router (e.g., router 12E) before restart. Restarting router 12D may use the information in RecoveryPath message received from downstream router 12E together with the Recovery_RRO in the RSVP PATH message received from upstream restarting router 12C to associate control and data plane state and to validate its forwarding state with the state presented by routers 12C and 12E.

Upstream restarting router 12C may instantiate its control plane state based on the downstream label associated with restarting router 12C (528). For example, when restarting router 12C receives a RSVP RESV message, restarting router 12C may determine whether the label value in RSVP RESV message differs from the downstream label learned by router 12C. If the values match, then restarting router 12C may re-instantiate its respective control plane state by using the label specified in the corresponding RSVP RESV message.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
    receiving, by a network device of a label switched path (LSP) implemented with a label stack and from an upstream network device to the network device in the LSP, a path signaling message including a recovery object that defines a reverse path of the LSP from an egress network device of the LSP to the network device, wherein the recovery object includes at least an upstream label and a downstream label associated with the network device, and wherein the network device is a restarting network device;
    determining, by the network device and based on the recovery object, the upstream label and the downstream label associated with the network device, wherein the upstream label associated with the network device comprises a label allocated by the network device for the upstream network device in the LSP, and wherein the downstream label associated with the network device comprises a label allocated by a downstream network device to the network device in the LSP; and
    instantiating, by the network device and based on the recovery object, a control plane state of the network device.

2. The method of claim 1, wherein the LSP implemented with the label stack comprises a resource reservation protocol with traffic engineering extensions (RSVP-TE) LSP implemented with pop and go tunneling.

3. The method of claim 1, wherein the recovery object includes a record route object (RRO) of a resource reservation protocol (RSVP) reservation message received by the upstream network device in the LSP.

4. The method of claim 1, wherein receiving the path signaling message comprises receiving a resource reservation protocol (RSVP) path message including the recovery object from the upstream network device.

5. The method of claim 4, wherein the recovery object is included in a Recovery_Label field of the RSVP path message.

6. The method of claim 1, further comprising;
    upon establishment of the LSP, sending, by the network device and to the upstream network device, a capability object indicating that the network device is capable of supporting the recovery object.

7. The method of claim 1, wherein the network device is a first restarting network device and the path signaling message is a first path signaling message, further comprising:
    detecting, by the first restarting network device, a second restarting network device that is downstream to the first restarting network device in the LSP;
    removing, by the first restarting network device and from the recovery object, one or more labels associated with the first restarting network device to construct a modified recovery object; and
    sending, by the first restarting network device and to the second restarting network device, a second path signaling message including the modified recovery object, wherein the modified recovery object includes at least an upstream label and a downstream label associated with the second restarting network device.

8. The method of claim 7, further comprising:
    upon establishment of the LSP, receiving, by the network device and from the downstream network device, a capability object indicating that the downstream network device is capable of supporting the recovery object.

9. The method of claim 1, further comprising:
    sending, by the network device and to the downstream network device, the downstream label from the recovery object as a suggested label in the path signaling message;
    validating, by the network device, the upstream label;
    receiving, by the network device, a first reservation signaling message from downstream network device with the suggested label and a record route object (RRO) of a reverse path from the egress network device to the network device; and
    sending, by the network device, a second reservation signaling message to upstream router including the upstream label and an updated RRO of the reverse path from the egress network device to the upstream network device.

10. A method comprising:
    detecting, by a network device of a label switched path (LSP) implemented with a label stack, a downstream network device that is downstream to the network device in the LSP is restarting;

generating, by the network device, a path signaling message including a recovery object, wherein the recovery object includes a reverse path of the LSP from an egress network device of the LSP to the network device, and wherein the recovery object includes at least an upstream label and a downstream label associated with the downstream network device, wherein the upstream label associated with the downstream network device comprises a label allocated by the downstream network device for the network device in the LSP, and wherein the downstream label associated with the downstream network device comprises a label allocated by a network device that is downstream to the downstream network device in the LSP; and sending, by the network device and to the downstream network device, the path signaling message.

11. The method of claim 10, wherein generating the path signaling message comprises generating a resource reservation protocol (RSVP) path message including the recovery object.

12. The method of claim 11, wherein generating the path signaling message further comprises including the recovery object in a Recovery_Label field of the RSVP path message.

13. The method of claim 10, further comprising:
upon establishment of the LSP receiving, by the network device and from the downstream network device, a capability object indicating that the downstream network device is capable of supporting the recovery object.

14. The method of claim 10, further comprising:
receiving, by the network device, a record route object (RRO) of a resource reservation protocol (RSVP) reservation message from the downstream network device before restart.

15. A network device of a label switched path (LSP) implemented with a label stack comprising:
at least one processor coupled to a memory, wherein the processor executes software configured to:
receive a path signaling message including a recovery object, wherein the recovery object that defines a reverse path of the LSP from an egress network device of the LSP to the network device, wherein the recovery object includes at least an upstream label and a downstream label associated with the network device, and wherein the network device is a restarting network device;
determine, based on the recovery object, the upstream label and the downstream label associated with the network device, wherein the upstream label associated with the network device comprises a label allocated by the network device for the upstream network device in the LSP, and wherein the downstream label associated with the network device comprises a label allocated by a downstream network device to the network device in the LSP; and
instantiate a control plane state of the network device based on the recovery object.

16. The network device of claim 15, wherein the LSP implemented with the label stack comprises a resource reservation protocol with traffic engineering extensions (RSVP-TE) LSP implemented with pop and go tunneling.

17. The network device of claim 15, wherein the recovery object includes a record route object (RRO) of a resource reservation protocol (RSVP) reservation message received by the upstream network device in the LSP.

18. The network device of claim 15, wherein, to receive the path signaling message, the software is configured to receive a resource reservation protocol (RSVP) path message including the recovery object from the upstream network device.

19. The network device of claim 18, wherein the recovery object is included in a Recovery_Label field of the RSVP path message.

20. The network device of claim 15, wherein the software is further configured to:
send, upon establishment of the LSP and to the upstream network device, a capability object indicating that the network device is capable of supporting the recovery object.

21. The network device of claim 15, wherein the network device comprises a first restarting network device and the path signaling message comprises a first path signaling message, and wherein the software is further configured to:
detect a second restarting network device that is downstream to the first restarting network device;
remove, from the recovery object, one or more labels associated with the first restarting network device to construct a modified recovery object; and
send a second path signaling message including the modified recovery object to the second restarting router, wherein the modified recovery object includes at least an upstream label and a downstream label associated with the second restarting network device.

22. The network device of claim 15, wherein the software is further configured to:
receive, upon establishment of the LSP and from the downstream network device, a capability object indicating that the downstream network device is capable of supporting the recovery object.

23. The network device of claim 15, wherein the software is further configured to:
send the downstream label from the recovery object as a suggested label in the path signaling message to the downstream network device;
validate the upstream label;
receive a first reservation signaling message from downstream network device with the suggested label and a record route object (RRO) of a reverse path from the egress network device to the network device; and
send a second reservation signaling message to upstream router including the upstream label and an updated RRO of the reverse path from the egress network device to the upstream network device.

24. A network device of a label switched path (LSP) implemented with a label stack comprising:
at least one processor coupled to a memory, wherein the processor executes software configured to:
detect a downstream network device that is downstream to the network device in the LSP is restarting;
generate a path signaling message including a recovery object, wherein the recovery object includes a reverse path of the LSP from an egress network device of the LSP to the network device, and wherein the recovery object includes at least an upstream label and a downstream label associated with the downstream network device, wherein the upstream label associated with the downstream network device comprises a label allocated by the downstream network device for the network device in the LSP, and wherein the downstream label associated with the downstream network device comprises a label allocated by a network device that is downstream to the downstream network device in the LSP; and send the path signaling message to the downstream network device.

25. The network device of claim 24, wherein, to generate the path signaling message, the software is configured to generate resource reservation protocol (RSVP) path message including the recovery object.

26. The network device of claim 25, wherein, to generate the path signaling message, the software is further configured to include the recovery object in a Recovery_Label field of the RSVP path message.

27. The network device of claim 24, wherein the software is further configured to receive, upon establishment of the LSP and from the downstream network device, a capability object indicating that the downstream network device is capable of supporting the recovery object.

28. The network device of claim 24, wherein the software is further configured to receive a record route object (RRO) of a resource reservation protocol (RSVP) reservation message from the downstream network device before restart.

* * * * *